United States Patent
Semper

(10) Patent No.: US 7,924,819 B2
(45) Date of Patent: Apr. 12, 2011

(54) VERSATILE SYSTEM FOR RADIO ACCESS NETWORK SESSION INFORMATION RETRIEVAL

(75) Inventor: William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 11/387,592

(22) Filed: Mar. 23, 2006

(65) Prior Publication Data

US 2007/0223452 A1   Sep. 27, 2007

(51) Int. Cl.
*H04L 12/66* (2006.01)

(52) U.S. Cl. ........ 370/352; 370/351; 370/392; 370/331; 455/436; 455/442; 709/227

(58) Field of Classification Search .................. 370/352, 370/331, 351, 392; 455/436, 442; 709/227
See application file for complete search history.

(56) References Cited

U.S. PATENT DOCUMENTS

| | | | | |
|---|---|---|---|---|
| 6,834,050 | B1* | 12/2004 | Madour et al. | 370/392 |
| 2002/0068565 | A1* | 6/2002 | Purnadi et al. | 455/436 |
| 2003/0053431 | A1* | 3/2003 | Madour | 370/331 |
| 2005/0094599 | A1* | 5/2005 | Ryu et al. | 370/331 |
| 2005/0118946 | A1* | 6/2005 | Colban et al. | 455/3.06 |
| 2005/0197101 | A1* | 9/2005 | Gupta | 455/410 |
| 2005/0237977 | A1* | 10/2005 | Sayeedi | 370/331 |
| 2006/0099972 | A1* | 5/2006 | Nair et al. | 455/458 |
| 2007/0153753 | A1* | 7/2007 | Comstock et al. | 370/338 |

\* cited by examiner

*Primary Examiner* — Patrick N Edouard
*Assistant Examiner* — Aung Win

(57) ABSTRACT

A session information retrieval system is disclosed that efficiently transfers mobile station session information among certain members of a radio access network. As a mobile station within the network—which is dormant in a first packet data zone of the network—moves to a second packet data zone, a PCF for the second packet zone contacts the PCF for the first packet data zone to retrieve session information for the MS. Having retrieved the MS's already-established session information, the second PCF obviates the need to re-establish or re-negotiate session information for the MS. Having forwarded the MS's session information to the second PCF, the first PCF may discard the now unneeded session information that would have otherwise been maintained indefinitely—freeing up valuable system resources.

20 Claims, 4 Drawing Sheets

VERSATILE SYSTEM FOR RADIO ACCESS NETWORK SESSION INFORMATION RETRIEVAL

TECHNICAL FIELD OF THE INVENTION

The present application relates generally to the field of wireless communications technologies and, more particularly, to structures and methods for efficiently managing session information among peers in a wireless radio access network.

BACKGROUND OF THE INVENTION

Increasing demand for more powerful and convenient data and information communication has resulted in the proliferation of a number of wireless communication technologies. Within the field of wireless communications, a number of industry standards and operational protocols have been developed to address the interoperability of disparate devices and equipment within a single wireless network. Many such standards and protocols provide for basic communication amongst network components regarding device configuration and operation. Commonly, such communication is provided in the form of one or more messages passed between components during the course of system operation.

Consider, for example, the general architecture and operation of a wireless Radio Access Network (RAN), such as a wireless RAN based upon a CDMA2000 standard (a registered trademark of the Telecommunications Industry Association, TIA-USA). Commonly within such a RAN, a Packet Data Serving Node (PDSN) is connected to one or more Packet Control Functions (PCFs). A messaging interface is provided between a PDSN and its associated PCFs for communicating operational information. Each PCF may be connected to a number of base stations (BSs), each of which—in turn—may be operatively coupled to a number of mobile stations (MSs). Various messaging interfaces may be provided between PCF and BS, as well between BS and MS.

In a typical operational scenario for such a system, an MS will establish a packet data session (PDS) on a particular BS, which will establish interface connections with its associated PCF for that session. That PCF, in turn, establishes connections with its associated PDSN. Each PCF controls several BSs, or other access points, and the footprint of combined coverage areas of these BSs makes up a packet data zone (PDZ) controlled by that PCF. Each PCF thus functions as a PDZ control component.

When—due to inactivity by the MS user—a PDS goes dormant, its BS drops traffic channel to the MS to preserve radio resources, and also removes an associated interface connection to the PCF. Before removing this interface connection to the PCF, the BS communicates session state information for the MS, which is then stored in the PCF. This is done so that when that MS re-activates the dormant PDS, the BS can simply retrieve the session information from the PCF, rather than the MS—resulting in faster PDS re-activation times.

Commonly, an MS may move to a new PDZ while in a dormant state. Each BS within a given PDZ broadcasts a Packet Zone Identifier (PZID), along with a System Identifier (SID) and Network Identifier (NID), on an overhead channel. When an MS recognizes such a signal from a new BS—indicating that it has crossed over to a new PDZ—it sends an Origination Message to the new BS. That BS then alerts its PCF of the presence of a new, dormant PDS, and that PCF attempts to contact the PDSN, which is connected to the previous PCF, so as to establish a new connection in case data arrives at the PDSN for the MS. The PCF does so using a standardized selection algorithm that is based on the MS's International Mobile Subscriber Identity (IMSI).

Unfortunately, conventional systems do not appear to allow a new host PCF to retrieve stored session information from a previous host PCF. This leads to delay in re-activating a PDS for the MS—especially where certain operational parameters (e.g., quality-of-service) need to be re-negotiated. In addition, if the new host PCF was not able to contact the previous host PDSN and therefore had to set up a connection with a new PDSN, a previous host PCF has no way of knowing how long to store session information for a dormant mobile. It may be possible that a given MS simply remains dormant, or that the MS has moved on to a new PDZ. Consequently, session information may be maintained on a previous host PCF indefinitely—unnecessarily consuming system resources.

As a result, there is a need for a system that provides structures and methods by which operators can configure networks to allow a new PCF, using MS-related information it receives from one of its BSs, to contact an old PCF to retrieve session information for a given MS—and by which an old PCF may discard unneeded session information after retrieval by another PCF—providing reliable, high performance wireless communications in an easy and efficient manner.

SUMMARY OF THE INVENTION

A versatile system, comprising various constructs and methods, provides structures and methods by which session information may be efficiently transferred among members of a radio access network.

As a mobile station within the network—which is dormant in a first packet data zone of the network—moves to a second packet data zone, a PCF for the second packet zone contacts the PCF for the first packet data zone to retrieve session information for the MS. Having retrieved the MS's already-established session information, the second PCF reduces or obviates substantial operational overhead that would otherwise be consumed by re-establishing or re-negotiating session information for the MS. Having forwarded the MS's session information to the second PCF, the first PCF may discard the now unneeded session information that would have otherwise been maintained indefinitely—freeing up valuable system resources.

Specifically, constructs and methods for PCF addressing, and related messaging, provide inter-PCF retrieval of session information. The present system structures information identifying a specific PCF (e.g., PZID, SID, and NID) in such a manner that, as an MS passes that information to a subsequent PCF, the subsequent PCF can address queries to and receive responses from the previous PCF. The present system defines a unique locator or address for each PCF (e.g., an IP address) into and from which identification data—such as PZID, SID, and NID—may be easily translated. Having rendered the PCFs accessible, the present system further defines set of query/response messages to provide retrieval of MS-related session information between PCFs.

The system of the present disclosure establishes a unique address for each coverage zone control component in a radio access network, and broadcasts the unique address for each coverage zone control component within its respective coverage zone. A data session, having specific session information, is established between a mobile station and a first coverage zone control component in a first coverage zone. The movement of the mobile station from the first coverage zone to a second coverage zone is identified. Data is provided to a second coverage zone control component in the second coverage zone that identifies the mobile station and the unique address for the first coverage zone control component. The specific session information is then transferred from the first coverage zone control component to the second coverage zone control component utilizing the data identifying the mobile station and the unique address for the first coverage zone control component.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "construct", "function", "element" or "component" mean any device, system or part thereof that controls or performs at least one operation, and may be implemented in hardware, firmware or software, or some combination of at least two of the same. It should be noted that the functionality associated with any particular construct or element may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
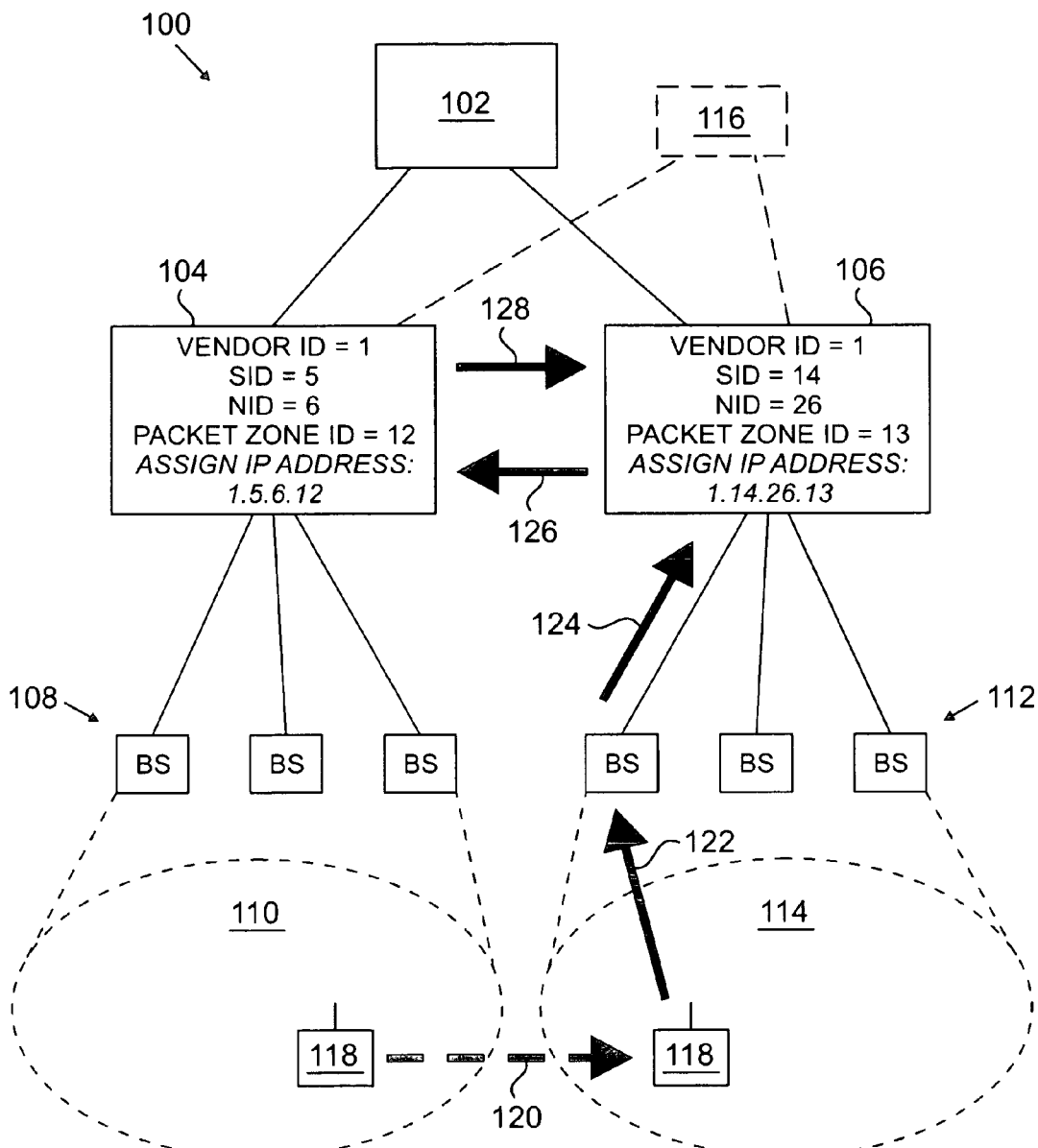
FIG. 1 illustrates one embodiment of wireless communications system segment in accordance with the present disclosure.
Figure 2A:
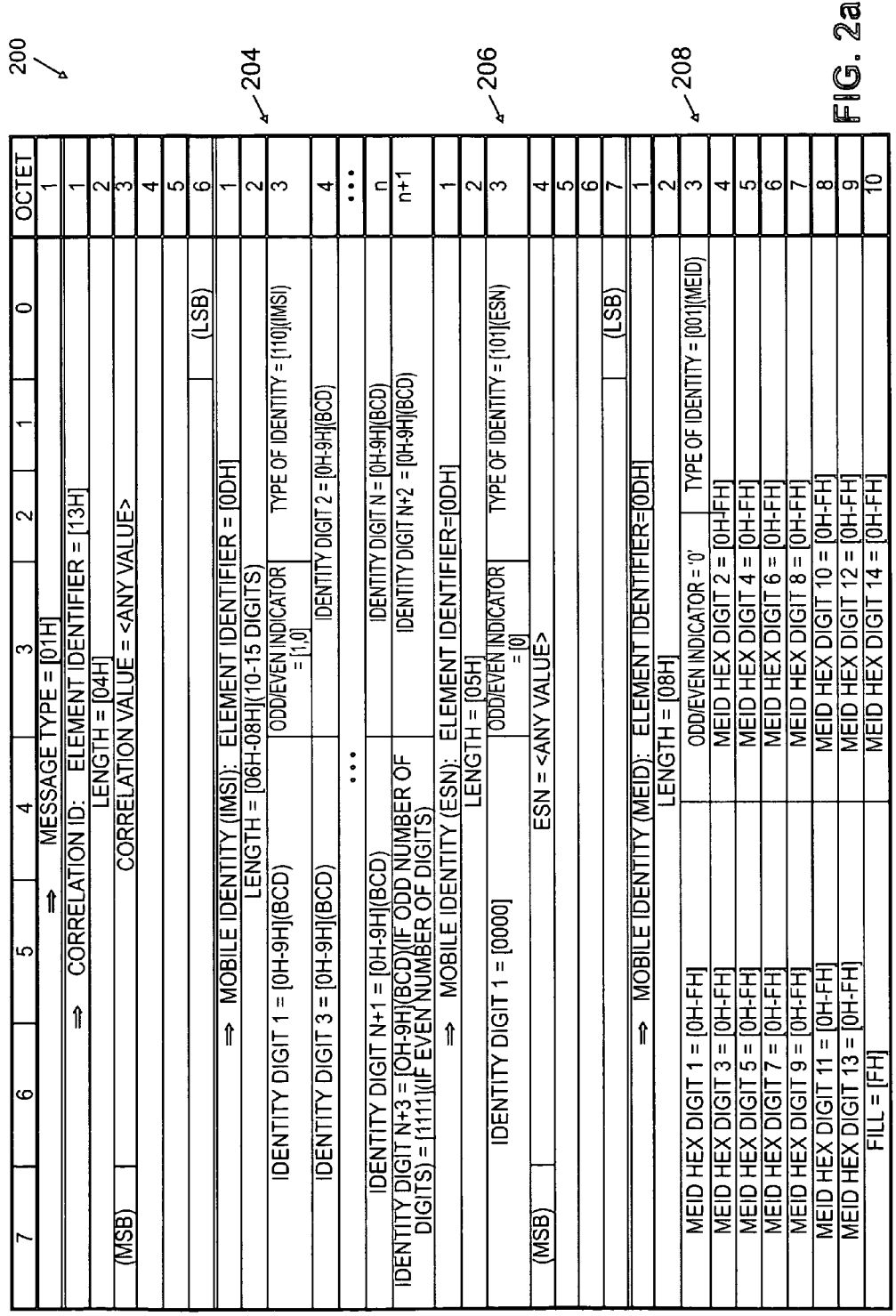
FIG. 2a illustrates one embodiment of message segment in accordance with the present disclosure.
Figure 2B:
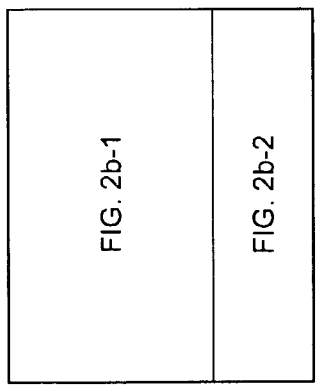
FIG. 2b illustrates another embodiment of a message segment in accordance with the present disclosure.
Figures 2, 2B:
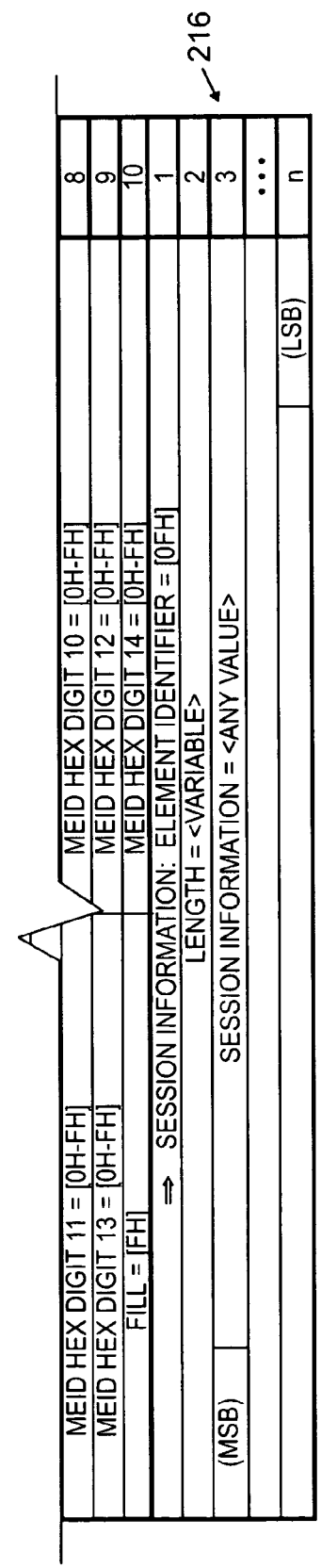
Figures 1, 2B:
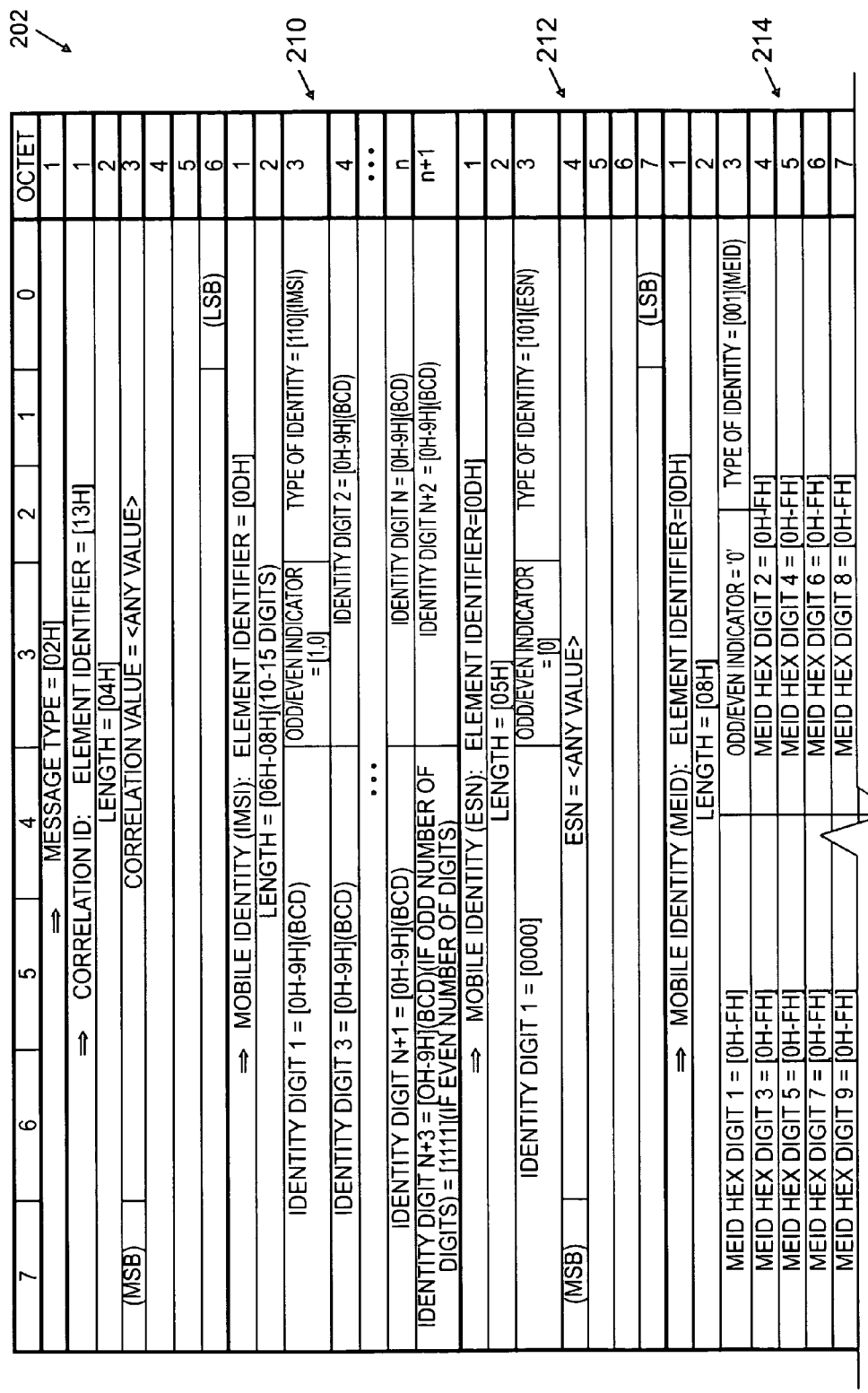

FIGS. 1-2b, discussed below, and the various embodiments used to describe the principles of the present disclosure in this patent document are by way of illustration only and should not be construed in any way to limit the scope of the disclosure. Hereinafter, certain aspects of the present disclosure are described in relation to illustrative structures, operations, protocols and standards—such as CDMA2000 and other related structures and processes. Those skilled in the art, however, will understand that the principles and teachings of the present disclosure may be implemented in any suitably arranged wireless radio access network.

The following discloses a versatile system providing structures and methods by which session information may be efficiently transferred among members of a radio access network —particularly coverage zone control components (i.e, PCFs). As a mobile station within the network—which is dormant in a first coverage zone (e.g., PDZ) of the network— moves to a second coverage zone, a coverage zone control component for the second coverage zone contacts its counterpart for the first coverage zone to retrieve session information for the MS. Having retrieved the MS's already-established session information, the second coverage zone control component reduces or obviates substantial operational overhead that would otherwise be consumed by re-establishing or re-negotiating session information for the MS. Having forwarded the MS's session information to the second coverage zone control component, the first coverage zone control component may discard the now unneeded session information that would have otherwise been maintained indefinitely— freeing up valuable system resources.

Under a number of conventional operating schemes, if an MS with a dormant PDS moves to a new PDZ, the MS will initiate a dormant handoff to establish connections between the PCF that governs the new PDZ and the PDSN. In conventional systems, session configuration information for an MS is stored in the controlling PCF when the MS transitions to dormant. However, this information is commonly lost if the dormant MS moves to a new PCF, since the new PCF does not know which PCF the MS just came from. Under conventional schemes, any data that an MS may have to identify its previous PCF (e.g., PZID, SID, NID) pertains only to the MS's session with that PCF, and does not correlate to an address or location that a future PCF—even one within the same network—can access. Frequently, such information may be arbitrarily assigned by various manufacturers, service providers or operators. Thus, once a dormant MS establishes contact with a new PCF, that PCF is unable to retrieve existing session information and must re-establish or re-negotiate it.

In contrast, the system of the present disclosure provides an addressing construct and related messaging that enables a new PCF to retrieve session information for an MS from a previous PCF. Specifically, the present system structures information identifying a specific PCF (e.g., PZID, SID, NID) in such a manner that, as an MS passes that information to a subsequent PCF, the subsequent PCF can address queries to and receive responses from the previous PCF. The present system defines a unique locator or address for each PCF (e.g., an IP address) into and from which identification data—such as PZID, SID, and NID—may be easily translated. Having rendered the PCFs accessible, the present system further defines a set of query/response messages to provide retrieval of MS-related session information between PCFs.

For purposes of illustration and explanation, FIG. 1 illustrates a segment 100 of a radio access network (RAN) system, according to certain aspects of the present disclosure. In the embodiment depicted, segment 100 is part of a CDMA2000-based RAN system—although, in other embodiments, segment 100 may be a part of any other wireless network system in which the present disclosure may be advantageously implemented. System segment 100 comprises a PDSN 102 that is operationally coupled to a first PCF 104 and a second PCF 106. PCF 104 is operationally coupled to a plurality of base stations 108, which serve as access points within and collectively provide a first coverage zone (i.e., a first PDZ) 110. PCF 106 is operationally coupled to a plurality of base stations 112, which serve as access points within and collectively provide a second coverage zone (i.e., a second PDZ) 114. Each PCF thereby functions as a coverage zone control component.

In system 100, PCFs 104 and 106 may be communicatively coupled to each other, and to or through PDSN 102, by an IP network which is privately administered by RAN operator. As such, PCFs 104 and 106 may each be assigned a desired IP address, utilizing an addressing construct 116. Depending upon the specific needs and limitations of a given system, construct 116 may comprise an automated process, a user-operated process, or some combination thereof. Construct 116 may comprise a software program or module residing within the operational framework of PDSN 102. In other embodiments, construct 116 may comprise an operator-initiated routine performed on a remote terminal. In other embodiments, construct 116 may comprise a combination of hardware and software elements resident with segment 100 that perform addressing only when a PCF is added to or removed from segment 100. Other variations and combinations thereof are further comprehended hereby.

For each PCF, construct 116 may compile that PCF's associated set of identification data (e.g., SID, NID, and PZID). Optionally, construct 116 may assign one or more additional identification parameters to each PCF. For example, in the embodiment depicted in FIG. 1, an operator-defined vendor ID number is associated with each PCF in the network. In other embodiments, an additional identification number may be randomly assigned, or replicate another identification data value (e.g., PZID). Once all necessary or desired identification data for a given PCF is compiled, construct 116 assembles or permutes that data into a unique access location or address for the PCF. In the embodiment depicted in FIG. 1, construct 116 assembles the vendor ID, SID, NID and PZID numbers for each PCF into a simple IP address; wherein the first octet comprises the vendor ID number, the second octet comprises the SID number, the third octet comprises the NID number, and the fourth octet comprises the PZID number. Depending upon the nature of RAN 100 and its internal communications protocols, other embodiments of construct 116 may provide each PCF with—for example—a hexadecimal address that corresponds to look-up table entries for the PCF's identification data. Various other embodiments may provide other forms of addressing for each entity, or may utilize various combinations of all such schemes.

Once such an address has been established for each PCF, each BTS associated with a given PCF broadcasts (e.g., via an overhead channel) identification data for the PCF; which may include the SID, NID, and PZID, which correspond to the PCF's address. As a mobile station 118 enters packet zone 110, it initiates communication (e.g., via an origination message) with a BS 108. A first packet data session (PDS) is established as session configuration information—such as the PCF address, the international mobile subscriber identity (IMSI), and service level negotiations—are exchanged, performed and recorded.

When MS 118 goes dormant, it stores the related SID, NID, and PZID of packet zone 110. During its dormancy, MS 118 then moves 120 into packet zone 114. Within packet zone 114, each BTS 112 broadcasts identification data for PCF 106; which may include the SID, NID, or PZID. When the now dormant MS 118 moves to packet zone 114—as determined by, for example, recognition of a new PZID—MS 118 initiates communication (e.g., via an origination message) 122 with a BS 112. This communication contains the identifier for PCF 104, e.g. the SID, NID, and PZID for PCF 104. Upon receipt of this information and retrieval of the IMSI for MS 118, the BS 112 passes 124 such data to the new PCF 106—via an A9-Setup-A8 message, for example—indicating that MS 118 has an already established PDS. Depending upon the nature and configuration of system 100, such communications may generally be provided using incumbent messaging systems and formats. In embodiments where system 100 is based upon CDMA2000, for example, such communications may be provided using existing messaging protocols—i.e., the A9-Setup-A8 message.

Once PCF 106 receives the information regarding MS 118 from BS 112, it initiates a session information retrieval message 126 directed to PCF 104. Since PCFs 104 and 106 both have unique addresses or location indicators, they may successfully exchange communications directly or, depending upon the nature of system 100, indirectly through another network entity. The session information retrieval message may comprise an indication of the return address or locator for PCF 106, the IMSI for MS 118, and a query for session information (e.g., quality of service (QoS) profiles) related to the first PDS established by MS 118 in packet zone 110.

Upon receipt of this retrieval message 126, PCF 104 sends a session information response message 128, addressed to PCF 106. Response message 128 transfers the session information related to the first PDS established by MS 118 in packet zone 110. Once PCF 104 has delivered such information to PCF 106, it may then discard the information, since it no longer needs to maintain the information in case MS 118 becomes active in packet zone 110. Upon receipt of response message 128, PCF 106 may store the session information for MS 118, for use when MS 118—or the network—decides to re-activate the associated PDS.

The retrieval message 126 and the response message 128 may be communicated, delivered or relayed by any appropriate incumbent messaging system or protocol. In other embodiments, the retrieval message 126 and the response message 128 may be communicated, delivered or relayed using other incumbent messaging or signaling interfaces. Retrieval message 126 and response message 128 may comprise independent, stand-alone messages, or may be integrated as segments of other messages. Other variations and combinations thereof are comprehended hereby.

Referring now to FIGS. 2*a* and 2*b*, illustrative portions of a session information request message 200 and a session information response message 202 are depicted, respectively. For purposes of illustration and explanation, these portions are depicted in a format compatible with messaging/signaling interfaces provided by CDMA2000. In FIG. 2*a*, request message 200 may comprise a number of fields for communicating operational data. Data identifying the mobile station for which session information is needed is of particular importance in the request. One or more fields or segments that identify the mobile station may be provided. A first field 204 may be provided for communicating the mobile station's IMSI. In addition, or in the alternative, another field 206 may be provided for communicating the mobile station's electronic serial number (ESN) data. In addition, or in the alternative, another field 208 may be provided for communicating the mobile station's mobile equipment identifier (MEID) data. Depending upon the nature of the network and its constituent components, other identification fields may be provided in addition or in the alternative.

In FIG. 2*b*, response message 202 may also comprise a number of fields for communicating operational data. Message 202 may comprise fields 210, 212 and 214 that correspond, respectively, to fields 204, 206 and 208 in message 200. Message 202 further comprises a session information field 216 which may be of a necessary or desired length and configuration to communicate session information parameters for a given mobile station. In certain embodiments, as in the one depicted in FIG. 2*b*, session information may be provided within a single message field. In alternative embodiments, session information may be provided in separate fields within a single message, or distributed across a plurality of response messages. Other variations and combinations thereof are comprehended hereby.

As previously noted, the embodiments described above are illustrated in the context of an incumbent messaging system of the type defined in 3GPP2 A.S0017, Interoperability Specification (IOS) for cdma2000 Access Network Interfaces; which is a supplement to the TIA-2001-C standard. Those specifications and standards are hereby incorporated by reference.

It should be apparent to those of skill in the art that the present disclosure is not limited solely to mobile handset devices. The present disclosure also encompasses other types of wireless access terminals (e.g., wireless laptop computers or PDAs). It should therefore be understood that the use of the term "mobile station" in the claims and in the description is intended to encompass a wide range of mobile devices (e.g., cell phones, wireless laptops).

Although certain aspects of the present disclosure have been described in relations to specific systems, standards and structures, it should be easily appreciated by one of skill in the art that the system of the present disclosure provides and comprehends a wide array of variations and combinations easily adapted to a number of wireless communications system. As described herein, the relative arrangement and operation of necessary functions may be provided in any manner suitable for a particular application. All such variations and modifications are hereby comprehended. It should also be appreciated that the constituent members or components of this system may be produced or provided using any suitable hardware, firmware, software, or combination(s) thereof.

The embodiments and examples set forth herein are therefore presented to best explain the present invention and its practical application, and to thereby enable those skilled in the art to make and utilize the system of the present disclosure. The description as set forth herein is therefore not intended to be exhaustive or to limit any invention to a precise form disclosed. As stated throughout, many modifications and variations are possible in light of the above teaching without departing from the spirit and scope of the following claims.

What is claimed is:

1. A radio access network system comprising:
a second coverage zone control component configured to control a second set of base stations in a second packet data zone and communicatively coupled to a first coverage zone control component by an incumbent messaging system, the first coverage zone control component configured to control a first set of base stations in a first packet data zone and operatively coupled to a packet data serving node; and
an addressing construct adapted to create a unique locator for each coverage zone control component in the radio access network, each unique locator being an internet protocol (IP) address that is used by a corresponding coverage zone control component to communicate with other coverage zone control components across radio access networks, the IP address comprising octets for a vendor identifier (VID), a system identifier (SID), a network identifier (NID), and a packet zone identifier (PZID) of the corresponding coverage zone control component,
wherein the second coverage zone control component is further configured to retrieve session information for a packet data session for a mobile station over the incumbent messaging system, the second coverage zone control component communicating with the first coverage zone control component by utilizing the first coverage zone control component's unique locator, and wherein the first coverage zone control component's unique locator is received by the second coverage zone control component from the mobile station.

2. The system of claim 1, wherein the coverage zone control components comprise packet control functions.

3. The system of claim 1, wherein the second coverage zone control component communicates a unique identifier of the mobile station to the first coverage zone control component to retrieve the session information.

4. The system of claim 3, wherein the unique identifier of the mobile station comprises an international mobile subscriber identity (IMSI).

5. The system of claim 3, wherein the mobile station sends the first coverage zone control component's unique locator and the unique identifier of the mobile station to the second coverage zone control component in response to detecting that the mobile station has moved from the first packet data zone to the second packet data zone based on a broadcast signal received from at least one of the second set of base stations, the broadcast signal comprising identification data of the second coverage zone control component.

6. The system of claim 1, wherein the unique locator comprises a look-up table locator.

7. The system of claim 1, wherein the addressing construct comprises at least one of an automated software component and an operator-initiated routine.

8. The system of claim 1, wherein the first coverage zone control component discards the session information after the second coverage zone control component has retrieved the session information.

9. A method of retrieving session information for a mobile station in a radio access network, comprising the steps of:
receiving, at a second packet control function (PCF), a message that a mobile station has moved into a second packet data zone from a first packet data zone, the second PCF configured to control packet data sessions in a second set of base stations in the second packet data zone, the first PCF configured to control packet data sessions in a first set of base stations in the first packet data zone, the message indicating that the mobile station has an already established packet data session with a first PCF;
determining a unique identifier of the first PCF from the message, the unique identifier comprising an internet protocol (IP) address that is used to communicate with a plurality of PCFs across radio access networks, the IP address comprising octets for a vendor identifier (VID), a system identifier (SID), a network identifier (NID), and a packet zone identifier (PZID) of the first PCF;
transmitting a request to the first PCF for a session information of the already established packet data session, the request transmitted by the second PCF using the unique identifier of the first PCF; and
storing, in the second PCF, the session information that is received from the first PCF.

10. The method of claim 9, wherein the radio access network is a spread-spectrum wireless network.

11. The method of claim 10, wherein the request comprises a unique identifier of the mobile station.

12. The method of claim 11, wherein the mobile station sends the first PCF's unique locator and the unique identifier of the mobile station to the second PCF in response to detecting that the mobile station has moved from the first packet data zone to the second packet data zone based on a broadcast signal received from at least one of the second set of base stations, the broadcast signal comprising identification data of the second PCF.

13. The method of claim 9, wherein the message that the mobile station has moved into the second packet data zone is received from a base station in the second coverage zone.

14. The method of claim 9, wherein sending the request for the session information comprises providing at least one of the mobile station's international mobile subscriber identity, the mobile station's electronic serial number, and the mobile station's mobile equipment identifier.

15. A radio access network system comprising:
a second packet control function (PCF) configured to manage packet data sessions for a second set of base stations within a second packet data zone, the second PCF having a second unique identifier and being communicatively coupled to a first PCF that is configured to manage packet data sessions for a first set of base stations within a first packet data zone and has a first unique identifier, the first and second unique identifiers comprising unique addresses in the radio access network,
wherein each unique identifier comprises an internet protocol (IP) address that is used by a corresponding PCF to communicate with a plurality of PCFs across radio access networks, the IP address comprising octets for a vendor identifier (VID), a system identifier (SID), a network identifier (NID), and a packet zone identifier (PZID) of the corresponding PCF,
wherein the second PCF is further configured to transmit a request to the first PCF for a session information of a mobile station that has entered the second packet data zone from the first packet data zone, the request transmitted utilizing the first PCF's unique identifier that was received from the mobile station.

16. The system of claim 15 further comprising an incumbent messaging system communicatively coupling the first PCF and the second PCF.

17. The system of claim 15 wherein the request comprises a unique identifier of the mobile station.

18. The system of claim 15, wherein the unique identifier of the mobile station comprises an international mobile subscriber identity (IMSI).

19. The system of claim 18, wherein the mobile station sends the first PCF's unique locator and the unique identifier of the mobile station to the second PCF in response to detecting that the mobile station has moved from the first packet data zone to the second packet data zone based on a broadcast signal received from at least one of the second set of base stations, the broadcast signal comprising identification data of the second PCF.

20. The system of claim 15, wherein the first PCF discards the session information from the first PCF after transmitting the session information to the second PCF.

* * * * *